(No Model.)
W. W. STALL.
RIM FOR WHEELS.
No. 509,258. Patented Nov. 21, 1893.
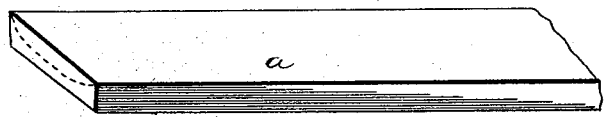
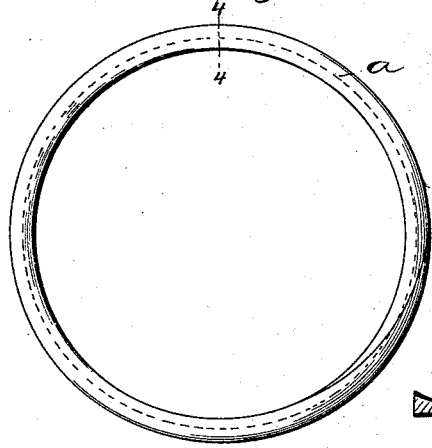
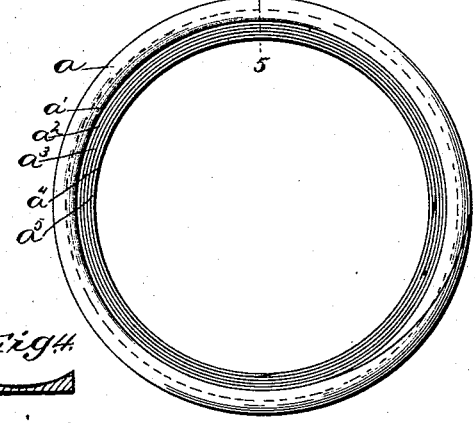
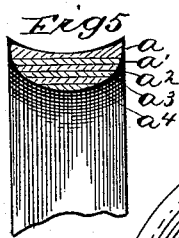
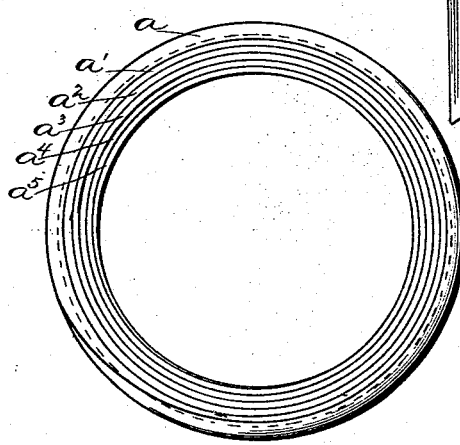
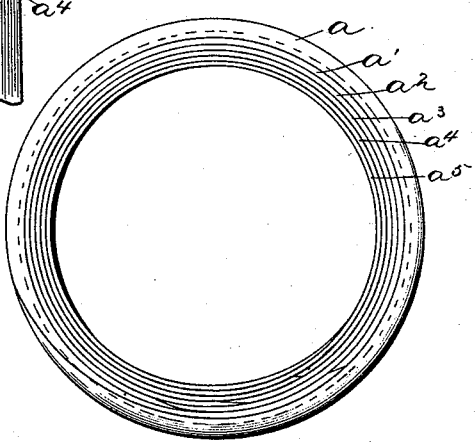
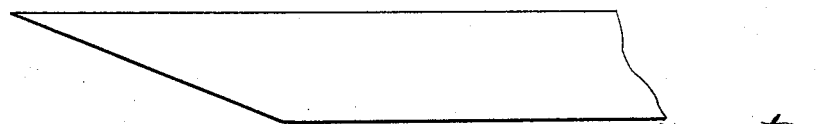
Witnesses
J. M. Fowler Jr.
Chas. B. Mill.
Inventor
William W. Stall
By Le A. Keate
his Attorney

UNITED STATES PATENT OFFICE.

WILLIAM W. STALL, OF BOSTON, MASSACHUSETTS.

RIM FOR WHEELS.

SPECIFICATION forming part of Letters Patent No. 509,258, dated November 21, 1893.

Application filed June 10, 1893. Serial No. 477,235. (No model.)

*To all whom it may concern:*

Be it known that I, WILLIAM W. STALL, a citizen of the United States, residing at Boston, in the county of Suffolk and State of Massachusetts, have invented certain new and useful Improvements in Rims or Fellies for Wheels; and I do hereby declare the following to be a full, clear, and exact description of the invention, such as will enable others skilled in the art to which it appertains to make and use the same.

This invention relates to the manufacture of rims or fellies for vehicle wheels, and more particularly to that class of rims or fellies made up or composed of a number of superposed layers or plies of wood.

Heretofore in constructing rims or fellies of this class the successive layers or plies of wood have been of substantially equal thickness throughout, and as the outer layer or ply is subjected to greater strain in use it has been found that said outer layer is apt to split or crack at the edges, and particularly so in rims having a peripheral groove in which to seat a tire, as said groove has been cut through the outer ply or layer of wood, so that in handling, the edges of the rim formed by said outer ply are liable to split off and render the rim useless.

The principal object of my invention is to avoid the objections here noted.

To this end the invention consists in the matters to be hereinafter described in detail, and then pointed out in the claims at the close of this specification.

In the accompanying drawings, Figure 1, is a perspective view of that end or part of a blank designed to form the outer grooved layer or ply of a rim, the outline of the tire groove being shown in dotted lines. Fig. 2, is a side elevation of an outer layer or ply, the bottom of the tire groove being indicated by dotted lines. Fig. 3, illustrates in side elevation a rim embodying the blank illustrated in Fig. 1. Fig. 4, is a section on line 4—4 of Fig. 2. Fig. 5, is a section on line 5—5 of Fig. 3. Figs. 6 and 7 are side elevations of wheel rims, illustrating different manners of building up a rim. Fig. 8, is a plan view of one end of a blank section.

As before stated, in wheel rims heretofore constructed of plies or ribbons of wood coiled one upon the other, the successive coils have been of substantially the same thickness throughout the rim, and it has been found in the construction of rims for bicycle and sulky wheels, to which use such composite rims are well adapted, that in forming the peripheral groove in the outer ply or layer of the rim for the reception of the tire, said groove will be cut entirely through one or more of the outer layers or plies of wood, so that in handling the rim, as in finishing, or placing the tire, or in use, a slight blow or pressure upon the side of said outer layer or layers which has been cut through, is liable to split it off, and render the rim worthless. This objection may be overcome by using an outer ply or layer of a thickness greater than the depth of the tire groove, so that it will be supported throughout the entire width of the rim by the next adjacent inner ply or layer, and I contemplate in some instances, building up the rim from a blank A, continuous or sectional, having a greater thickness at that end which is to form the outer layer or ply of the rim, so that the peripheral groove B formed therein for the reception of a tire, will extend but partly through said outer layer or ply, said ply being thus supported throughout its entire width by the next succeeding inner layer or ply.

The particular form of blank may be varied, of course, to some extent, as it will be evident that a continuous blank may be used one end of which is of greater thickness than the rest of the blank as illustrated in Fig. 6 of the drawings, or for convenience of manufacture and handling, said blank may be in sections or lengths as in Figs. 3 and 7, one of which, namely, the length which is to form the outermost layer of the rim is of such thickness as to permit of the formation of the necessary tire groove B therein without cutting entirely through the wood.

In forming these rims the blank A (whether of the continuous or sectional form) is coiled within a mold or form, the successive layers or plies being cemented as the work progresses, in a manner well known. I prefer to build up a rim from without inward, for the reason that the spring of the wood used in the construction of these rims, maintains each ply or layer in close contact with the next larger one, during the building up of the rim, thus facilitating the setting of the glue or cement, and for the further reason that each rim will have a diameter corresponding exactly with that of all the other rims made in the same mold or form. In forming a rim from a sectional blank the thinner sections $a^4$ $a^3$ $a^2$ $a'$ are preferably arranged to break joints, as shown, and may be coiled in a continuous manner, as in Fig. 7, or each section may form a complete ply in itself, as in Fig. 3. When coiled continuously each section should be of such length that its ends will overlap to a greater or less extent, the outer end of the second section $a'$ abutting against the inner end of the outer section $a$ and so on, and said ends of the respective sections may be chamfered in the direction of their thickness to lap each other thus providing a lap or splice joint, which may be cemented or not according to the views of the manufacturer. It will be also apparent that the respective sections $a$ $a'$ $a^2$ $a^3$ $a^4$ may be of progressively decreasing thickness so that the rim made from such sectional blanks would be practically the same in appearance as one formed of a single blank having a gradual taper from its thicker to its thinner end; or the outer ply $a$ may be of the requisite thickness to contain the groove, and the thickness of the respective inner sections or plies may be equal or varied to suit the views of manufacturers, or to produce desired effects in appearance, the essential feature of this part of my invention being the employment of an outer section, layer or ply of sufficient thickness to contain the tire groove B. In using a sectional blank I prefer, to cut the ends of the sections diagonally as in Fig. 8, and to make a butt joint of such diagonally cut ends, as I thereby derive all the advantages of a splice joint at only such expenditure of time and labor as is required to make a butt joint.

The groove B in the thicker end, or section of the blank, constituting the outer ply of the rim, may be formed therein on a molding or other suitable machine before said blank has been coiled, or subsequent to said coiling, though I prefer, in otherwise shaping the rim, that is, in providing the usual convexity at the inner side, to give elegance of finish, to dress said rim after the layers or plies have been properly coiled and cemented together to make a composite whole.

One advantage derived from the employment of a sectional blank, aside from the greater facility for handling, is that the adjacent sections of the blank may be selected from stock having the grain running in different ways so that the grain of adjacent layers or plies of the rim will not lie parallel, thus lessening the liability of the rim to split.

While I prefer to build up these rims from the outer layer or ply inward, for the reasons hereinbefore stated, it will be evident to those skilled in the art, that they may be built up in the reverse order upon a mandrel, as is usual.

What I claim is—

1. The method of making coiled ply wheel rims, which consists in coiling the plies successively, one within another within a mold or form, and cementing them to each other, whereby the resilience of said successive plies is utilized to clamp the preceding plies, substantially as described.

2. An outer section for composite or multiply wheel rims consisting of a strip or ribbon of wood coiled to form a continuous ring or hoop and provided with a peripheral groove to receive a tire, substantially as described.

3. A rim for wheels comprising a plurality of layers or plies of wood cemented together, the outermost one of which is of greater thickness than the other layers or plies, substantially as described.

4. A rim for wheels comprising a plurality of layers or plies of wood cemented together, the outermost layer or ply being provided with a tire groove extending but partly through its thickness, substantially as described.

5. A rim for wheels comprising a plurality of layers or plies of wood cemented together, the outermost layer or ply being of greater thickness than the inner one and being provided with a tire groove extending but partly through its thickness, substantially as described.

6. A rim for wheels consisting of two or more blank sections or lengths, coiled one upon another to form a plurality of layers or plies, the outermost layer or ply being of greater thickness than the other layers or plies, substantially as described.

7. A rim for wheels consisting of two or more blank sections or lengths of different thickness coiled one upon another to form a plurality of layers or plies, the outermost layer or ply being provided with a tire groove extending but partly through its thickness, substantially as described.

In testimony whereof I affix my signature in presence of two witnesses.

WILLIAM W. STALL.

Witnesses:
  I. F. HUNTINGTON,
  H. B. LORD.